United States Patent
Furuzawa et al.

(10) Patent No.: US 8,390,990 B2
(45) Date of Patent: Mar. 5, 2013

(54) SOLID ELECTROLYTIC CAPACITOR HAVING A CATHODE LEAD FRAME

(75) Inventors: Atsushi Furuzawa, Habikino (JP); Hiroaki Izu, Hirakata (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 293 days.

(21) Appl. No.: 12/750,954

(22) Filed: Mar. 31, 2010

(65) Prior Publication Data

US 2010/0271758 A1 Oct. 28, 2010

(30) Foreign Application Priority Data

Apr. 22, 2009 (JP) ................... 2009-103500

(51) Int. Cl.
*H01G 4/228* (2006.01)
*H01G 9/04* (2006.01)
*H01G 9/145* (2006.01)
(52) U.S. Cl. ...................... 361/533; 361/532
(58) Field of Classification Search ............... 361/532, 361/533, 538, 540, 523
See application file for complete search history.

(56) References Cited

U.S. PATENT DOCUMENTS

| | | | | |
|---|---|---|---|---|
| 6,188,566 B1 * | 2/2001 | Aoyama | ...................... | 361/534 |
| 6,891,716 B2 * | 5/2005 | Maier et al. | ................... | 361/523 |
| 6,972,943 B2 * | 12/2005 | Kato et al. | .................... | 361/533 |
| 7,744,990 B2 * | 6/2010 | Yagi et al. | ................. | 428/304.4 |

FOREIGN PATENT DOCUMENTS

| | | | |
|---|---|---|---|
| JP | 01037006 A | * | 2/1989 |
| JP | 2005-101480 A | | 4/2005 |

* cited by examiner

*Primary Examiner* — David M Sinclair
(74) *Attorney, Agent, or Firm* — Westerman, Hattori, Daniels & Adrian, LLP

(57) ABSTRACT

A solid electrolytic capacitor includes a capacitor element having an anode portion, a dielectric film and a cathode portion, an anode lead frame, a cathode lead frame, and a molded resin for covering at least a part of the anode and cathode lead frames and the capacitor element. In a cathode lead frame opposed portion opposed to the capacitor element with a conductive adhesive material being interposed is provided with a through hole having a narrowed portion smaller in diameter than other portions between a capacitor-element-side opening portion and a molded-resin-side opening portion, and the conductive adhesive material is formed in the through hole.

5 Claims, 5 Drawing Sheets

SOLID ELECTROLYTIC CAPACITOR HAVING A CATHODE LEAD FRAME

BACKGROUND OF THE INVENTION

1. Field of the Invention

The present invention relates to a solid electrolytic capacitor formed by connecting a capacitor element to a cathode lead frame.

2. Description of the Background Art

A solid electrolytic capacitor having a structure as shown in FIG. 7 has been known as a conventional solid electrolytic capacitor. This solid electrolytic capacitor includes a capacitor element 91, an anode lead frame 93, a cathode lead frame 94, and a molded resin 92. As shown in FIG. 8, capacitor element 91 is constituted of an anode element 911 on which an anode lead member 912 is erected, a dielectric film 913 formed on an outer peripheral surface of anode element 911, a solid electrolyte layer 914 formed on dielectric film 913, and a cathode draw-out layer 915 formed on solid electrolyte layer 914. Anode element 911 is formed of a sintered object of a valve metal (such as tantalum, niobium, titanium, and aluminum).

Anode lead member 912 constituting capacitor element 91 is electrically connected to anode lead frame 93 through resistance welding, laser welding or the like. Cathode draw-out layer 915 of capacitor element 91 is electrically connected to cathode lead frame 94 through a conductive adhesive material 95. Anode lead frame 93 and cathode lead frame 94 are drawn out of molded resin 92 and bent along a side surface and a lower surface of the solid electrolytic capacitor.

In addition, a solid electrolytic capacitor having a structure as shown in FIG. 9 has also been known as another conventional solid electrolytic capacitor (for example, Patent Document 1: Japanese Patent Laying-Open No. 2005-101480). This solid electrolytic capacitor is different from the conventional solid electrolytic capacitor shown in FIG. 7 in that two through holes 941 are provided in cathode lead frame 94. Through holes 941 are filled with conductive adhesive material 95.

In a process for manufacturing the conventional solid electrolytic capacitor shown in FIG. 7, however, capacitor element 91 has been bonded to cathode lead frame 94 by placing capacitor element 91 on cathode lead frame 94, for example, with a conductive adhesive liquid 95L mainly composed of silver being interposed, thereafter performing heating and curing conductive adhesive liquid 95L.

Meanwhile, in order to enhance conductivity, a material mainly composed of copper has been used for cathode lead frame 94, however, such cathode lead frame 94 is greater in coefficient of linear expansion than conductive adhesive material 95 or capacitor element 91 and large shearing stress remains between cathode lead frame 94 and conductive adhesive material 95 during heating followed by cooling. Therefore, a crack may be produced in conductive adhesive material 95 after such electronic devices as a portable telephone or a computer containing the solid electrolytic capacitor have been marketed. Thermo cycle tests for testing change over time revealed low reliability, because ESR was poor due to production of a crack in conductive adhesive material 95.

In addition, since conductive adhesive liquid 95L lies between capacitor element 91 and cathode lead frame 94, a solvent in conductive adhesive liquid 95L is difficult to vaporize and escape to the atmosphere during the heating step and the vaporized solvent may remain as bubbles in cured conductive adhesive material 95. If bubbles are formed in conductive adhesive material 95 as such, bonding strength between cathode lead frame 94 and capacitor element 91 is lowered and equivalent series resistance (ESR) disadvantageously deteriorates.

Moreover, in the conventional solid electrolytic capacitor shown in FIG. 9, conductive adhesive material 95 introduced in hole 941 is exposed at a surface of cathode lead frame 94 and further protrudes into molded resin 92 (see FIG. 1 of Patent Document 1). A distance between a tip end of a protruding portion 95A of conductive adhesive material 95 and the outer periphery of molded resin 92 is thus smaller than a distance between the surface of cathode lead frame 94 and the outer periphery of molded resin 92. If external force is applied to that portion, that portion may be deformed and broken (that is, mechanical strength may become lower). Further, as a degree of protrusion is greater, protruding portion 95A is exposed through molded resin 92, which in turn gives rise to such problems as poor moisture-resistance characteristics or poor appearance. In order to suppress the degree of protrusion to a prescribed level or lower, process management becomes complicated and hence cost is increased.

Furthermore, the vaporized solvent of conductive adhesive material 95 is exhausted to the atmosphere through hole 941, however, a cross-sectional area of hole 941 is small and an amount of exhaust is small, which leads to formation of bubbles in conductive adhesive material 95. If the cross-sectional area of hole 941 is made larger in order to avoid formation of bubbles, the degree of protrusion of conductive adhesive material 95 becomes greater and the aforementioned problem is more likely.

SUMMARY OF THE INVENTION

An object of the present invention is to provide a solid electrolytic capacitor free from formation of bubbles in a conductive adhesive material, achieving high bonding strength between cathode lead frame 94 and capacitor element 91 in an early stage, good ESR, less deterioration of ESR even after heat cycle tests, and improved reliability, and capable of preventing lowering in mechanical strength, deterioration of moisture-resistance characteristics, poor appearance, and increase in cost.

A solid electrolytic capacitor according to the present invention includes: a capacitor element having an anode portion, a dielectric film, and a cathode portion; an anode lead frame; a cathode lead frame; and a molded resin for covering at least a part of the anode and cathode lead frames and the capacitor element. A cathode lead frame opposed portion opposed to the capacitor element with a conductive adhesive material being interposed is provided with a through hole having a narrowed portion smaller in diameter than other portions between a capacitor-element-side opening portion and a molded-resin-side opening portion. The conductive adhesive material is formed in the through hole.

Preferably, the narrowed portion is provided closer to the capacitor-element-side opening portion relative to a central portion in a direction of depth of the through hole.

In addition, preferably, the through hole is filled with the molded resin.

Preferably, a plurality of through holes are provided and centers of the through holes are arranged on a substantial circumference.

Preferably, the conductive adhesive material is introduced to go beyond the narrowed portion from the capacitor-element-side opening portion.

According to the solid electrolytic capacitor of the present invention, bubbles are not formed in the conductive adhesive material, bonding strength between the cathode lead frame and the capacitor element is high in an early stage, a good ESR is achieved, deterioration of ESR is less even after heat cycle tests, reliability is improved, and lowering in mechanical strength, deterioration of moisture-resistance characteristics, poor appearance, and increase in cost can be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter with reference to the drawings.

Figure 1:
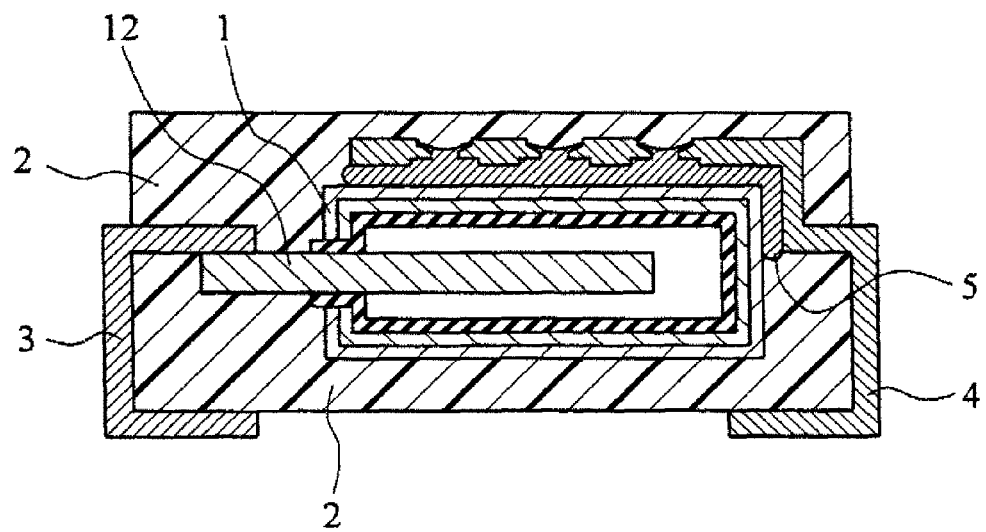
FIG. 1 is a cross-sectional view of a solid electrolytic capacitor according to an embodiment of the present invention.
Figure 2:
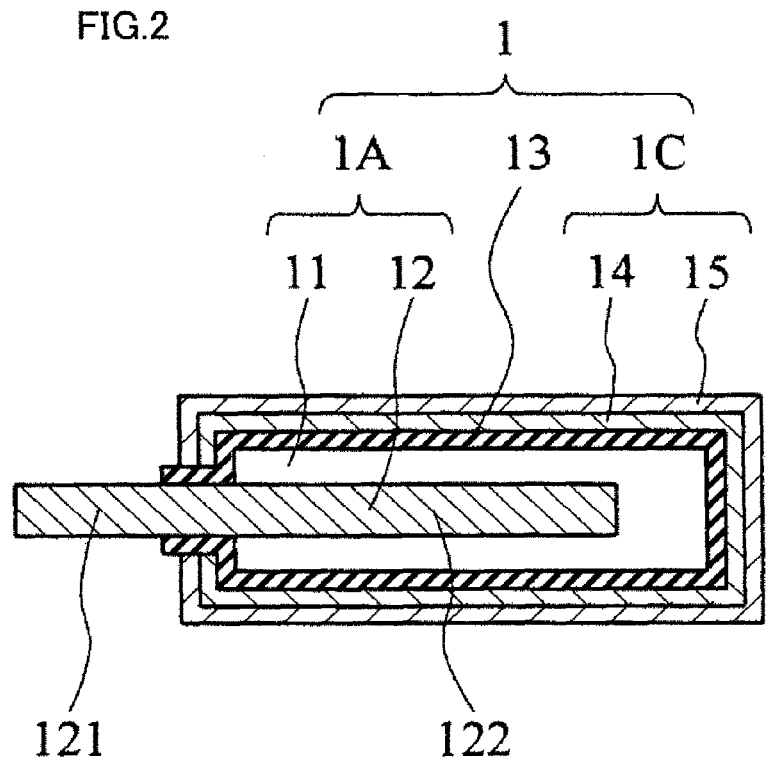
FIG. 2 is a cross-sectional view of a capacitor element in the embodiment of the present invention.

FIG. 1 shows a cross-sectional view of a solid electrolytic capacitor according to an embodiment of the present invention. The solid electrolytic capacitor includes a capacitor element 1, an anode lead frame 3, a cathode lead frame 4, and a molded resin 2. As shown in FIG. 2, capacitor element 1 is constituted of an anode element 11 on which an anode lead member 12 is erected, a dielectric film 13 formed on an outer peripheral surface of anode element 11, a solid electrolyte layer 14 formed on dielectric film 13, and a cathode draw-out layer 15 formed on solid electrolyte layer 14.

Anode element 11 is formed of, a sintered object of a valve metal (such as tantalum, niobium, titanium, and aluminum).

Anode lead member 12 has an anode lead draw-out portion 121 projecting from an outer peripheral surface of anode element 11 and an anode lead buried portion 122 buried in anode element 11. Anode lead member 12 is composed of a valve metal of a type the same as or different from that of the valve metal forming anode element 11, and anode element 11 and anode lead member 12 are electrically connected to each other. Anode element 11 and anode lead member 12 constitute an anode portion 1A.

Dielectric film 13 is formed from an oxide film formed on the outer peripheral surface of anode element 11. The oxide film is formed by immersing anode element 11 in an electrolytic solution such as a phosphoric acid solution or an adipic acid solution and electrochemically oxidizing the outer peripheral surface of anode element 11 (anodic oxidation).

Solid electrolyte layer 14 is formed on dielectric film 13 from a conductive inorganic material such as manganese dioxide, a conductive organic material such as TCNQ (Tetracyano-quinodimethane) complex salt, a conductive polymer (for example, polypyrrole, polythiophene, polyaniline, or the like), or the like.

Cathode draw-out layer 15 is formed from a carbon layer formed on solid electrolyte layer 14 and a silver paste layer formed on the carbon layer, and solid electrolyte layer 14 and cathode draw-out layer 15 are electrically connected to each other. Solid electrolyte layer 14 and cathode draw-out layer 15 constitute a cathode portion 1C.

Anode lead draw-out portion 121 of anode lead member 12 constituting capacitor element 1 is electrically connected to anode lead frame 3 through resistance welding, laser welding or the like. Cathode portion 1C of capacitor element 1, that is, cathode draw-out layer 15, is electrically connected to cathode lead frame 4 through a conductive adhesive material 5. Anode lead frame 3 and cathode lead frame 4 are drawn out of molded resin 2 and bent along a side surface and a lower surface of the solid electrolytic capacitor.

An exposed portion of the anode lead frame exposed through the molded resin of the solid electrolytic capacitor and an exposed portion of the cathode lead frame are soldered to a land of a circuit board on which the solid electrolytic capacitor is to be mounted.

Figure 3:
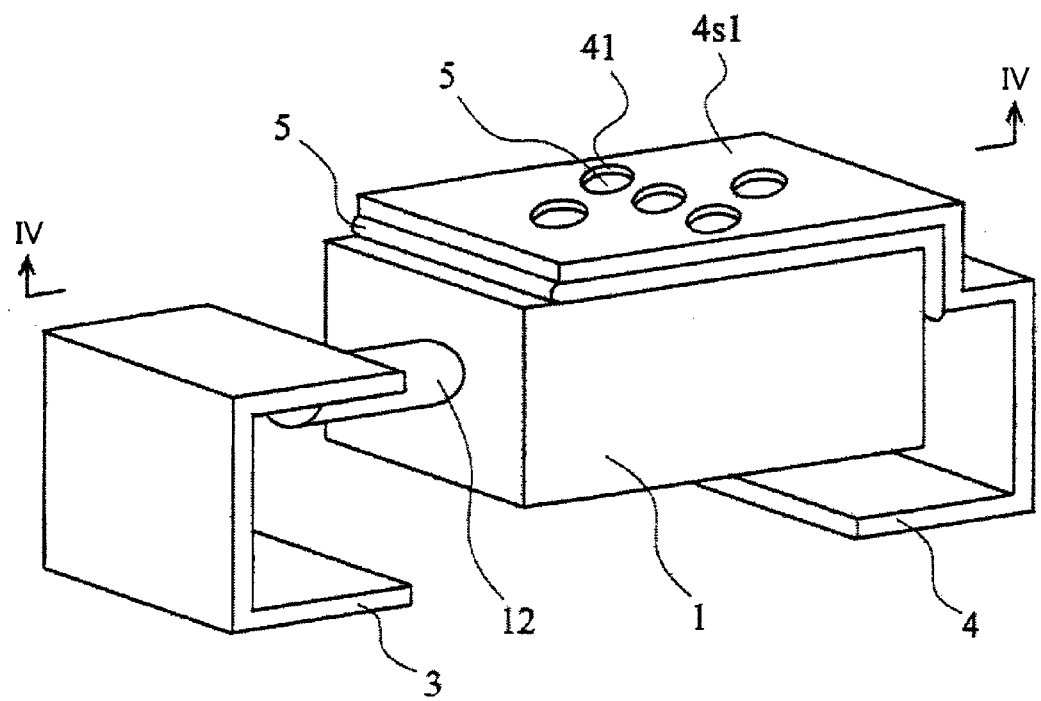
FIG. 3 is a perspective view illustrating a through hole in the embodiment.
Figure 4:
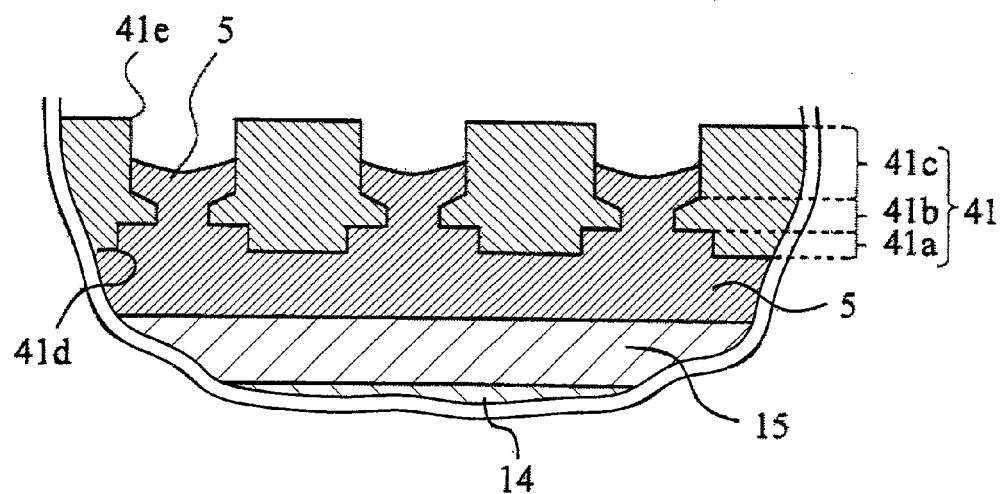
FIG. 4 is a partial cross-sectional end view of a portion in the vicinity of a through hole in a cathode lead frame along the line IV-IV shown in FIG. 3.

FIG. 3 shows a perspective view of the solid electrolytic capacitor from which molded resin 2 has been removed. Five through holes 41 are provided in a portion of connection between cathode lead frame 4 and capacitor element 1. FIG. 4 shows a partial cross-sectional end view of a portion in the vicinity of through holes 41 along the line IV-IV in FIG. 3. Through hole 41 includes a flow stagnation portion 41a, a narrowed portion 41b and an exhaust portion 41c, from the side of conductive adhesive material 5 toward molded resin 2 (not shown, because it has been removed).

Conductive adhesive material 5 that has flowed into through hole 41 through a through hole inlet (a capacitor-element-side opening portion) 41d flows into exhaust portion 41c through flow stagnation portion 41a and narrowed portion 41b, however, it does not reach a through hole outlet portion (a molded-resin-side opening portion) 41e.

Figure 5A:
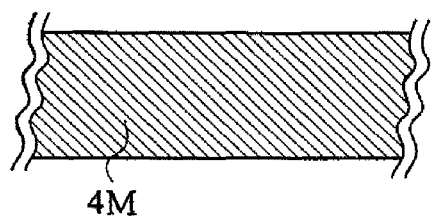
FIGS. 5A to 5D are diagrams illustrating the steps of forming the through hole in the embodiment.
Figure 5B:
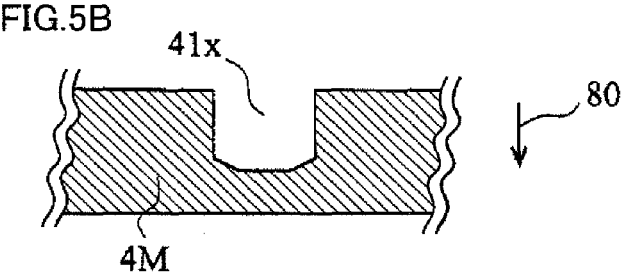
Figure 5C:
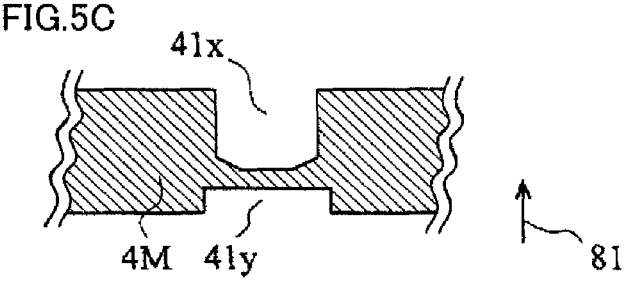
Figure 5D:
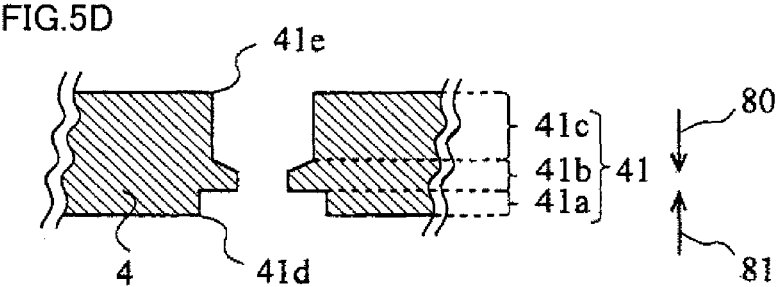

Referring to FIGS. 5A to 5D, a method of manufacturing through hole 41 in cathode lead frame 4 described above will be described. Initially, as shown in FIG. 5A, a cathode lead frame base material 4M is prepared. Then, as shown in FIG. 5B, a recess portion 41x is formed by pressing in a direction 80. Then, as shown in FIG. 5C, a recess portion 41y is formed by pressing in a direction 81. Further, as shown in FIG. 5D, recess portion 41x and recess portion 41y are made to communicate with each other by pressing in direction 80 or direction 81. Through hole 41 can thus be formed. The manufacturing method is not limited thereto and the through hole can also be made by chemical etching or the like instead of pressing.

Figure 6A:
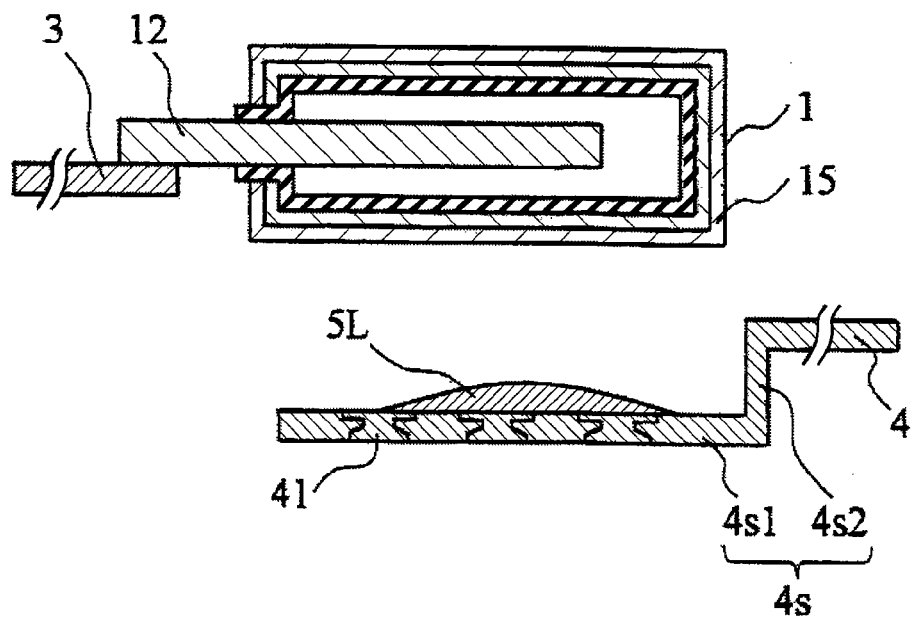
FIGS. 6A to 6C are diagrams illustrating the steps of bonding the cathode lead frame in the embodiment.
Figure 6B:
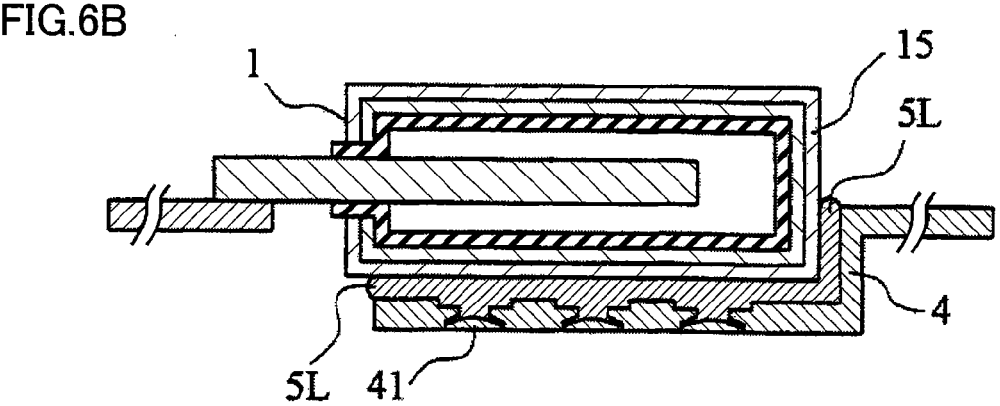
Figure 6C:
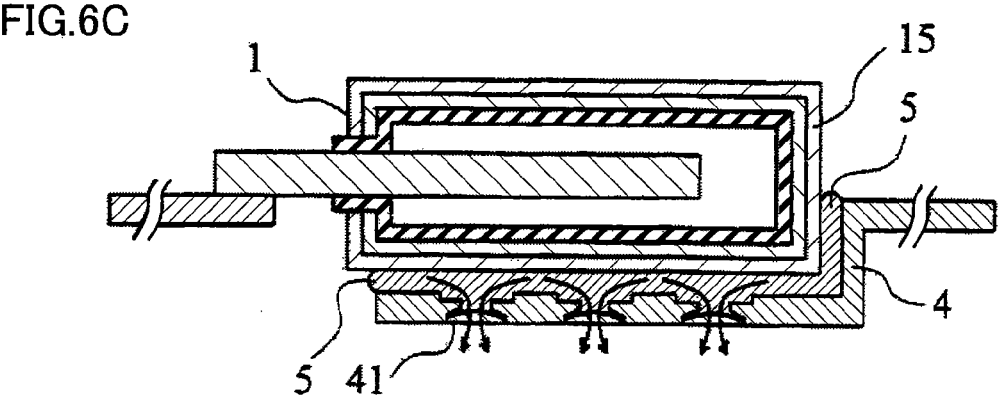
Figure 7:
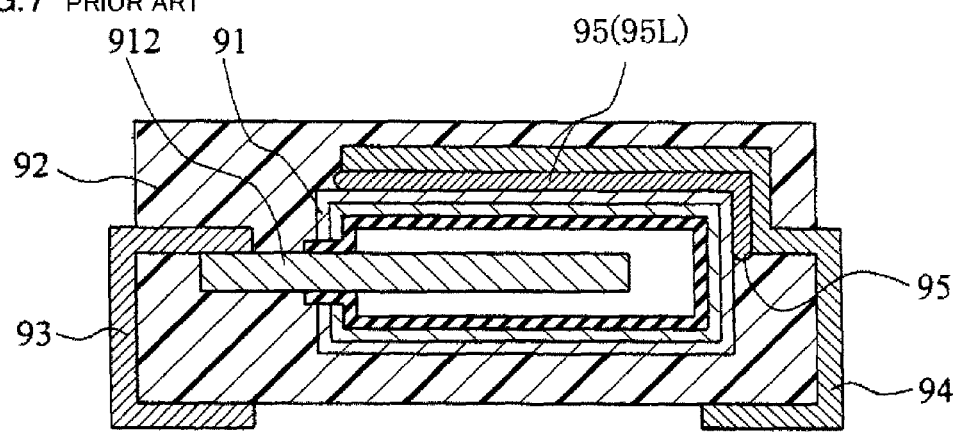
FIG. 7 is a cross-sectional view of a conventional solid electrolytic capacitor.
Figure 8:
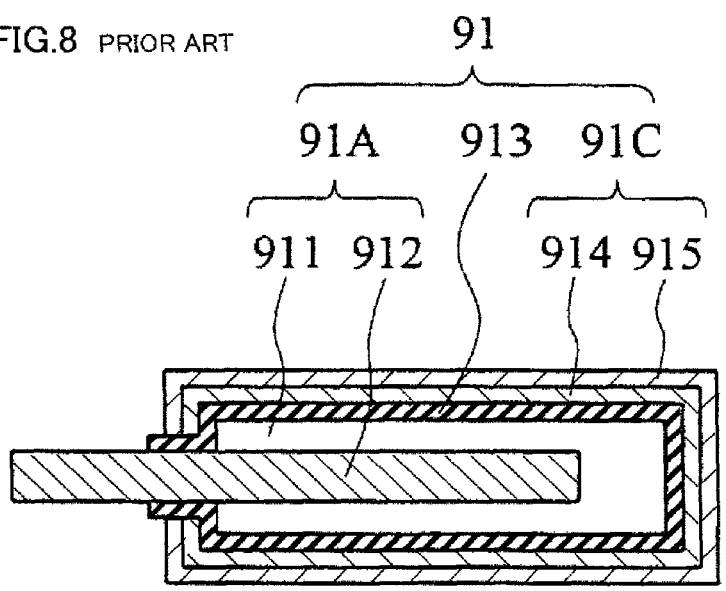
FIG. 8 is a cross-sectional view of a capacitor element in the conventional solid electrolytic capacitor.

Referring next to FIGS. 6A to 6C, bonding of the cathode lead frame to the capacitor element will be described. Initially, as shown in FIG. 6A, cathode lead frame 4 is arranged in a jig (not shown) in such a manner that the state shown in FIG. 1 is inverted. Then, a conductive adhesive liquid 5L mainly composed of silver is applied to a surface of a cathode lead frame parallel portion 4s1 in parallel to a direction of extension of anode lead member 12 and a surface of cathode lead frame perpendicular portion 4s2 perpendicular to the direction of extension, which are portions of anode lead frame 4 opposed to the capacitor element. It is noted that cathode lead frame parallel portion 4s1 and cathode lead frame perpendicular portion 4s2 constitute a cathode lead frame opposed portion 4s.

Then, as shown in FIG. 6B, capacitor element 1 is moved toward and pressed against cathode lead frame 4, so as to bring capacitor element 1 in contact with conductive adhesive liquid 5L. Conductive adhesive liquid 5L thus spreads in between capacitor element 1 and cathode lead frame 4, so that capacitor element 1 and cathode lead frame opposed portion 4s are opposed to each other with conductive adhesive liquid 5L lying therebetween. Then, conductive adhesive liquid 5L flows into through hole 41 through through hole inlet 41d and flows into exhaust portion 41c (see FIG. 4) through flow stagnation portion 41a and narrowed portion 41b. Since the through hole has a smaller diameter at narrowed portion 41b, movement of conductive adhesive liquid 5L is impeded by surface tension of conductive adhesive liquid 5L and it does not reach through hole outlet 41e. Therefore, a protruding portion of conductive adhesive material 5 is not formed as in the solid electrolytic capacitor according to the conventional technique in FIG. 9, and such problems as deterioration of mechanical strength, deterioration of moisture-resistance characteristics, poor appearance, and increase in cost due to complicated process management are not caused.

Then, as shown in FIG. 6C, conductive adhesive liquid 5L is cured by heating, to thereby form conductive adhesive material 5. Thus, cathode draw-out layer 15 of capacitor element 1, that is cathode portion 1C, and cathode lead frame 4 are bonded to each other. During this heating step, a solvent in conductive adhesive liquid 5L lying between capacitor element 1 and cathode lead frame 4 tends to be vaporized. Here, as through hole 41 is formed in cathode lead frame 4, a solvent component moves in a direction shown with an arrow in FIG. 6C and it is exhausted to the atmosphere through exhaust portion 41c (see FIG. 4). Therefore, bubbles of the solvent are not produced in conductive adhesive material 5, bonding strength between cathode lead frame 4 and capacitor element 1 is also satisfactory, and deterioration of ESR can also be avoided.

In addition, since conductive adhesive material 5 reaches exhaust portion 41c from through hole inlet 41d of through hole 41 through flow stagnation portion 41a and narrowed portion 41b, conductive adhesive material 5 filling through hole 41 serves as an anchor (see FIG. 4). In particular, since narrowed portion 41b is present, behavior of conductive adhesive material 5 is restricted even when the solid electrolytic capacitor is in such a condition that an external environment drastically changes. Therefore, generation of a crack due to shearing stress resulting from difference in coefficient of linear expansion among cathode lead frame 4, conductive adhesive material 5 and capacitor element 1 can be suppressed.

Figure 9:
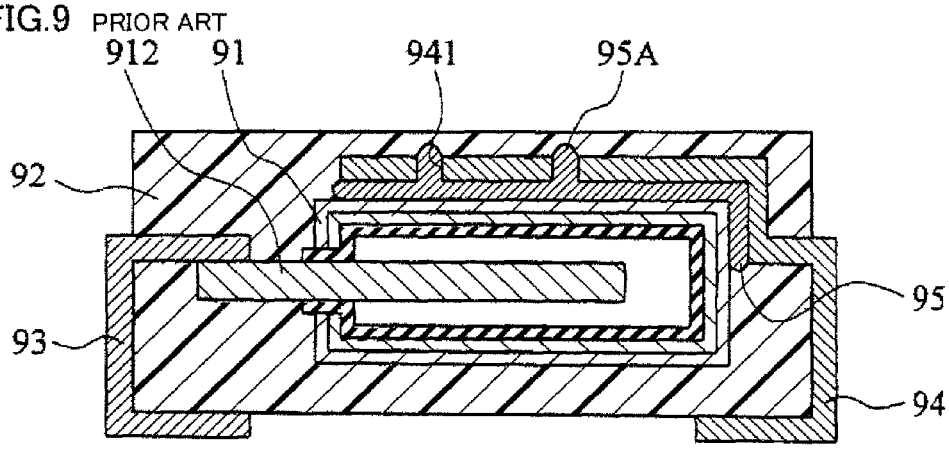
FIG. 9 is a cross-sectional view of another conventional solid electrolytic capacitor.

As described previously, in the conventional solid electrolytic capacitor shown in FIG. 9, when a diameter of hole 941 is made larger, conductive adhesive material 95 flows due to gravity and protruding portion 95A is formed. In contrast, in the solid electrolytic capacitor in the present embodiment, even when a diameter of flow stagnation portion 41a is made larger, conductive adhesive liquid 5L does not go beyond through hole outlet 41e owing to surface tension of conductive adhesive liquid 5L, because narrowed portion 41b is provided. Therefore, as the diameter of flow stagnation portion 41a can be made larger, an advantageous effect that vaporization of the solvent in conductive adhesive liquid 5L can also be promoted can also be achieved.

(Performance Evaluation)

Thirty solid electrolytic capacitors each including cathode lead frame 4 in which through hole 41 is arranged in a central portion of cathode lead frame parallel portion 4s1 and four through holes identical in shape are concentrically arranged around the former (five in total) as shown in FIG. 3 were fabricated as Example 1. Flow stagnation portion 41a, a narrowest portion of narrowed portion 41b, and exhaust portion 41c have diameters of 0.6 mm, 0.2 mm, and 0.4 mm, respectively. In addition, flow stagnation portion 41, narrowed portion 41b, and exhaust portion 41c have lengths in a direction of extension of through hole 41 of 0.02 mm, 0.02 mm, and 0.07 mm, respectively. Further, 30 solid electrolytic capacitors each including cathode lead frame 4 with no through hole 41 were also fabricated as Conventional Example.

Initial ESR was measured for Example 1 and Conventional Example. Thereafter, 2000 cycles of heat shock tests were conducted, assuming a temperature environment of −55° C. for 30 minutes and 105° C. for 30 minutes as one cycle. After 2000 cycles were completed, ESR was measured again. After post-heat-shock-test ESR was measured, peel strength of the capacitor element and the cathode lead frame was also measured, with the anode lead frame and the cathode lead frame being pulled away from each other in a direction of extension of the anode lead member.

Tables 1 summarizes an ESR initial value, an ESR after heat shock tests, a rate of variation of the ESR, and peel strength. It can be seen from Table 1 that, in Example 1 having through holes 41, variation of ESR after heat shock tests is 2.5 times greater than the initial value, which is smaller than 6.3 times in Conventional Example. In addition, peel strength is also greater.

TABLE 1

| Sample | ESR | | | Peel Strength kgf/mm |
|---|---|---|---|---|
| | Initial Value (mΩ) | After 2000 Cycles of Heat Shock Tests (mΩ) | 2000 Cycles/Initial Value (times) | |
| Example 1 | 10.6 | 26.5 | 2.5 | 1.8 |
| Conventional Example | 14.2 | 89.9 | 6.3 | 0.6 |

In addition, whether bubbles were produced in the conductive adhesive material or not was observed after measurement of peel strength. Bubbles were produced in Conventional Example, however, no bubbles were produced in Example 1.

It is more advantageous to provide narrowed portion 41b closer to capacitor-element-side opening portion 41d relative to a central portion in a direction of depth of through hole 41, for the following reason. If narrowed portion 41b is provided closer to molded-resin-side opening portion 41e relative to the central portion in a direction of depth of through hole 41, conductive adhesive liquid 5L introduced into exhaust portion 41c through narrowed portion 41b goes beyond molded-resin-side opening portion 41e and a protruding portion of conductive adhesive material 5 may be produced.

A structure of each portion in the present invention is not limited to the embodiment above, and various modifications can be made within the technical scope defined by the terms of claims. In Example 1, five through holes are provided, however, the number of through holes is merely by way of example. For example, four through holes in total may be provided, with the through hole arranged in the center among the five through holes in FIG. 3 being excluded. Namely, such an embodiment is also possible that centers of the through holes are arranged on a substantial circumference around the center and the conductive adhesive liquid is applied to the central portion. Here, as an amount of the conductive adhesive material with which each through hole 41 is filled is uniform, an effect of the present invention can sufficiently be exhibited.

In addition, a vertical cross-sectional shape of the through hole is not limited to that in the embodiment, and a narrowed portion made smaller in diameter should only be provided between a capacitor-element-side opening portion and a molded-resin-side opening portion. In addition, so long as a diameter of narrowed portion 41b is smaller than the diameter of capacitor-element-side opening portion 41d and the diameter of molded-resin-side opening portion 41e, such an embodiment is naturally within the technical scope of the invention of the present application. Furthermore, though through hole 41 is provided only in cathode lead frame parallel portion 4s1 in the embodiment, it may also be provided in cathode lead frame perpendicular portion 4s2.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor, comprising:
   a capacitor element having an anode portion, a dielectric film, and a cathode portion;
   an anode lead frame;
   a cathode lead frame; and
   a molded resin for covering at least a part of the anode and cathode lead frames and said capacitor element,
   said cathode lead frame having a cathode lead frame opposed portion opposed to said capacitor element with a conductive adhesive material being interposed and provided with a through hole in which said conductive adhesive material is introduced, and
   said through hole including
      a capacitor-element-side opening portion opening to said capacitor element,
      a molded-resin-side opening portion opening to said molded resin, and
      a narrowed portion provided between said capacitor-element-side opening portion and said molded-resin-side opening portion and made smaller in diameter, wherein
   a portion of the through hole without the conductive adhesive included therein is filled with said molded resin.

2. The solid electrolytic capacitor according to claim 1, wherein
   said narrowed portion is provided closer to said capacitor-element-side opening portion relative to a central portion in a direction of depth of said through hole.

3. The solid electrolytic capacitor according to claim 1, wherein
   a plurality of said through holes are provided and centers of the through holes are arranged on a substantial circumference.

4. The solid electrolytic capacitor according to claim 1, wherein
   said conductive adhesive material is introduced to go beyond said narrowed portion from said capacitor-element-side opening portion.

5. A solid electrolytic capacitor, comprising:
   a capacitor element having an anode portion, a dielectric film, and a cathode portion;
   an anode lead frame;
   a cathode lead frame; and
   a molded resin for covering at least a part of the anode and cathode lead frames and said capacitor element,
   said cathode lead frame having a cathode lead frame opposed portion opposed to said capacitor element with a conductive adhesive material being interposed and provided with a through hole in which said conductive adhesive material is introduced, and
   said through hole comprising:
      a capacitor-element-side opening portion opening to said capacitor element,
      a molded-resin-side opening portion opening to said molded resin, and
      a narrowed portion provided between said capacitor-element-side opening portion and said molded-resin-side opening portion and made smaller in diameter, wherein
   said narrowed portion is provided closer to said capacitor-element-side opening portion relative to a central portion in a direction of depth of said through hole.

* * * * *